United States Patent [19]

Karube

[11] 4,130,769
[45] Dec. 19, 1978

[54] BRUSHLESS DC MOTOR

[75] Inventor: Yukuo Karube, Yokohama, Japan

[73] Assignees: Canon Kabushiki Kaisha; Canon Seiki Kabushiki Kaisha, both of Tokyo, Japan

[21] Appl. No.: 627,844

[22] Filed: Oct. 31, 1975

[30] Foreign Application Priority Data

Nov. 1, 1974 [JP] Japan .............................. 49-126332
Nov. 13, 1974 [JP] Japan .............................. 49-130632

[51] Int. Cl.$^2$ ............................................. H02K 37/00
[52] U.S. Cl. ..................................... 310/46; 310/156; 310/179; 310/DIG. 3; 318/138
[58] Field of Search ............... 310/46, 68 R, 68 B, 310/67, 40, 40 MM, 156, DIG. 3, 152, 216, 217, 180, 184, 202, 206, 198, 266, 179; 318/138, 254

[56] References Cited

U.S. PATENT DOCUMENTS

| | | | |
|---|---|---|---|
| 3,018,395 | 1/1962 | Carlstein | 310/40 |
| 3,529,192 | 9/1970 | Davies | 310/202 |
| 3,541,361 | 11/1970 | Nola | 310/46 |
| 3,548,223 | 12/1970 | Dittrich | 310/10 |
| 3,548,224 | 12/1970 | Dittrich | 310/46 |
| 3,644,765 | 2/1972 | Janson | 318/254 |
| 3,805,134 | 4/1974 | Osamu | 310/254 |
| 3,845,334 | 10/1974 | Harada | 310/46 |

Primary Examiner—R. Skudy
Attorney, Agent, or Firm—Fitzpatrick, Cella, Harper & Scinto

[57] ABSTRACT

A brushless motor has a rotor composed of a permanent field magnet, an armature functioning as stator and a position detecting element for detecting the positions of magnetic poles of said permanent magnet rotor and accordingly switching the electric current to an armature coil body of said stator thereby causing rotary motion of said permanent magnet rotor. Said armature coil body contains plural coils of given number of turns in a polygonal form of which at least two sides are placed parallel to the rotary axis of motor. Said coils are mutually arranged in a partially overlapping relationship to form a cylindrical body with one of said two sides being located at the internal surface of said cylindrical body while the other side is located at the external surface thereof so as to compose a coreless cylindrical armature body.

15 Claims, 12 Drawing Figures (a)  (b)

(a)

(b)

(c)

BRUSHLESS DC MOTOR

BACKGROUND OF THE INVENTION

1. Field of the Invention

This invention relates to a brushless motor.

2. Description of the Prior Art

A brushless DC motor utilizing a rotor composed of a permanent field magnet, an armature functioning as stator and a position detecting element for detecting the position of magnetic poles of said permanent magnet rotor and accordingly switching the electric current to said armature stator thereby causing rotary motion of said rotor is already disclosed for example in U.S. Pat. No. 3,548,224. In the brushless DC motor disclosed in the above mentioned patent there is provided a coil holding element in such a manner to enclose a permanent magnet rotor, which coil holding element is provided with armature coils thereon which are supported by an annular stationary yoke composed of a smooth iron core provided around said coils, and there is also provided a position detecting element in a place on said stator so as to detect the position of magnetic poles of said permanent magnet rotor through said coil holding element and said armature coil. Such motor, due to the structure thereof in which the permanent magnet rotor is enclosed in the coil holding element and the armature coils constituting a part of stator, is unable to permit separate manufacture of stator and rotor followed by simple assembly of the thus prefabricated stator and rotor, but inevitably requires sequential steps of placing the coil holding element around the permanent magnet rotor, then winding the armature coil on said coil holding element and so on, and thus allows only a very poor production efficiency. Also, the rotor is generally supported rotatably by the shaft thereof in the bearings of the stator, and high speed rotation usually required in small-sized motors results in wear in a relatively short period in said bearings provided on the stator, or in said shaft at the parts thereof in contact with said bearings. Since the rotation accuracy of the motor is significantly affected by such wear, frequent replacement is inevitable for such motors when used in precision instruments. In such case it is a general practice to replace not the whole expensive motor but the worn parts, i.e. the bearings on the stator or the rotor. For example, if the rotor shaft is worn out, the worn rotor is extracted and replaced by a new rotor, and the precision of rotation is tested. However, the motor structure shown in U.S. Pat. No. 3,548,224 wherein a permanent magnet rotor is enclosed in a coil holding element on which certain turns are wound is not capable of accepting such dismantling and reassembly, as the replacement of rotor or stator alone inevitably requires the steps of dismantling the armature coil, removing the coil holding element, reassembling the coil holding element around the replaced rotor and rewinding the armature coil. Further, the position detecting element, detecting the positions of magnetic poles of the permanent magnet rotor through said coil holding element and armature coil, receives very little magnetic flux from said permanent magnet rotor and thus is unable to provide satisfactory electronic control.

In order to prevent the difficulty of dismantling and reassembly in a brushless DC motor wherein a permanent magnet rotor is enclosed in a coil holding element on which is provided an armature coil, there is already proposed, in U.S. Pat. No. 3,488,566, a motor structure employing an armature coil of a drug-cup shape with one open end in which a permanent magnet rotor is placed. In such a brushless DC motor, the accuracy of rotation and the torque are significantly dependent on the structure of the armature coil and, in order to improve these properties, it is necessary to increase the magnetic flux density by reducing the length of the magnetic gap or by increasing the number of armature coil turns. Also, as to the shape of said armature coil, the radial dimension and the thickness thereof have to be maintained constant or otherwise there will result an unbalanced distribution of magnetic flux which will inevitably necessitate tedious adjustments at the assembly of motor. Thus, such an armature is not suitable for mass production and is unable to provide a satisfactorily high efficiency. Further, as the efficiency of an armature coil improves as the thickness thereof decreases, it is vitally necessary in such a brushless DC motor to provide as many coils as possible without widening the gap in the magnetic circuit, thereby increasing the magnetic flux density in said gap. However, the above mentioned U.S. Pat. No. 3,488,566 merely discloses a structure of an armature coil of a drug-cup shape with one open end in which a permanent magnet rotor is placed, and does not show the position of the position detecting element for detecting the positions of magnetic poles of the permanent magnet rotor, which is extremely important for realizing accurate rotation, nor does it provide any description as to the structure of the armature coil body adapted to increase the magnetic flux density. Besides, the armature coil disclosed in said patent has a thickness at the connecting portions at the open end thereof which is larger than the remaining part, and the rotor is placed in said armature coil and at a position so as not to collide with said thicker part, thereby preventing an unbalanced structure of the rotor. As a result, the thicker part extends outwardly from said rotor, thus increasing unnecessarily the axial dimension of the motor.

SUMMARY OF THE INVENTION

The first object of the present invention is to provide a novel brushless DC motor comprising a rotor composed of a permanent field magnet and an armature functioning as stator.

The second object of the present invention is to provide a brushless DC motor comprising a rotor composed of a permanent field magnet, an armature functioning as a stator, and a position detecting element for detecting the position of magnetic poles of said permanent magnet rotor and accordingly switching the electric current to an armature coil body in said stator, thereby causing rotary motion of said rotor.

The third object of the present invention is to provide a brushless DC motor comprising a rotor composed of a permanent field magnet, and an armature functioning as a stator which is provided with an armature coil body capable of supplying satisfactorily balanced magnetic flux to the whole rotor.

The fourth object of the present invention is to provide a brushless DC motor comprising a rotor composed of a permanent field magnet, an armature functioning as a stator, and a position detecting element for detecting the position of the magnetic poles of said permanent magnet rotor and accordingly switching the electric current to an armature coil body in said stator, thereby causing the rotary motion of said rotor, said armature coil body being capable of supplying satisfactorily balanced magnetic flux to the whole rotor.

The fifth object of the present invention is to provide a brushless DC motor comprising a rotor composed of a permanent field magnet, an armature functioning as a stator, and a position detecting element for detecting the position of the magnetic poles of said permanent magnet rotor and accordingly switching the electric current to an armature coil body in said stator, thereby causing the rotary motion of said stator, said armature coil body being structured so as to maximize the amount of magnetic flux of said permanent magnet rotor encountered by said position detecting element thereby realizing a highly accurate rotation.

The sixth object of the present invention is to provide a brushless DC motor comprising a rotor composed of a permanent field magnet and an armature functioning as a stator, wherein said armature coil body contains plural coils of a predetermined number of turns in a polygonal shape of which at least two sides are placed parallel to the rotary axis of the motor, said coils being mutually arranged in a partially overlapping relationship to form a cylindrical body in which one of said two sides is located at the internal surface of said cylindrical body while the other side is located at the external surface thereof, so as to compose a coreless cylindrical armature body thereby achieving a hignly accurate rotation and an elevated torque.

The seventh object of the present invention is to provide a brushless DC motor comprising a rotor composed of a permanent field magnet, an armature functioning as stator, and a position detecting element for detecting the position of magnetic poles of said permanent magnet rotor and accordingly switching the electric current to an armature coil body in said stator, thereby causing rotary motion of said rotor wherein said armature coil body contains plural coils of a predetermined number of turns in a polygonal shape of which at least two sides are placed parallel to the rotary axis of the motor, said coils being mutually arranged in a partially overlapping relationship to form a cylindrical body in which one of said two sides is located at the internal surface of said cylindrical body while the other side is located at the external surface thereof, so as to compose a coreless cylindrical armature thereby achieving a highly accurate rotation and an elevated torque.

The eighth object of the present invention is to provide a novel process for producing an armature coil body capable of supplying satisfactorily balanced magnetic flux to the rotor in a brushless DC motor, comprising a rotor composed of a permanent field magnet and an armature functioning as a stator.

Other objects of the present invention will be clarified in the following detailed description with particular reference to the attaching drawings.

DESCRIPTION OF THE PREFERRED EMBODIMENTS

The brushless DC motor of the present invention will be further explained with respect to some embodiments thereof shown in the attached drawings.

Figure 1:
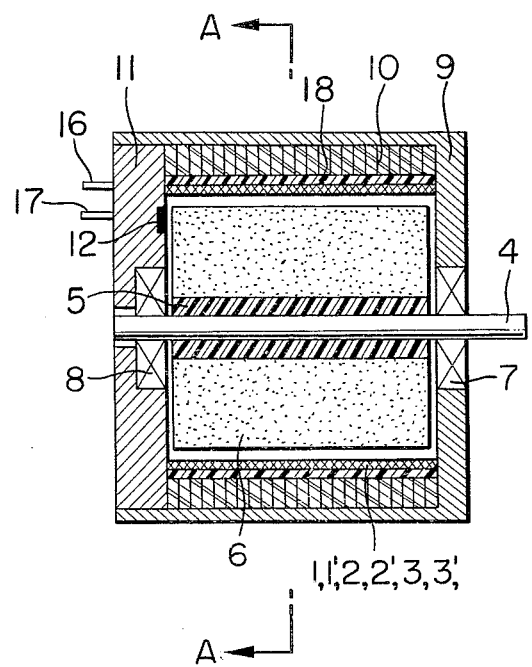
FIG. 1 is an axial cross sectional view of an embodiment of the brushless DC motor of the present invention.
Figure 2:
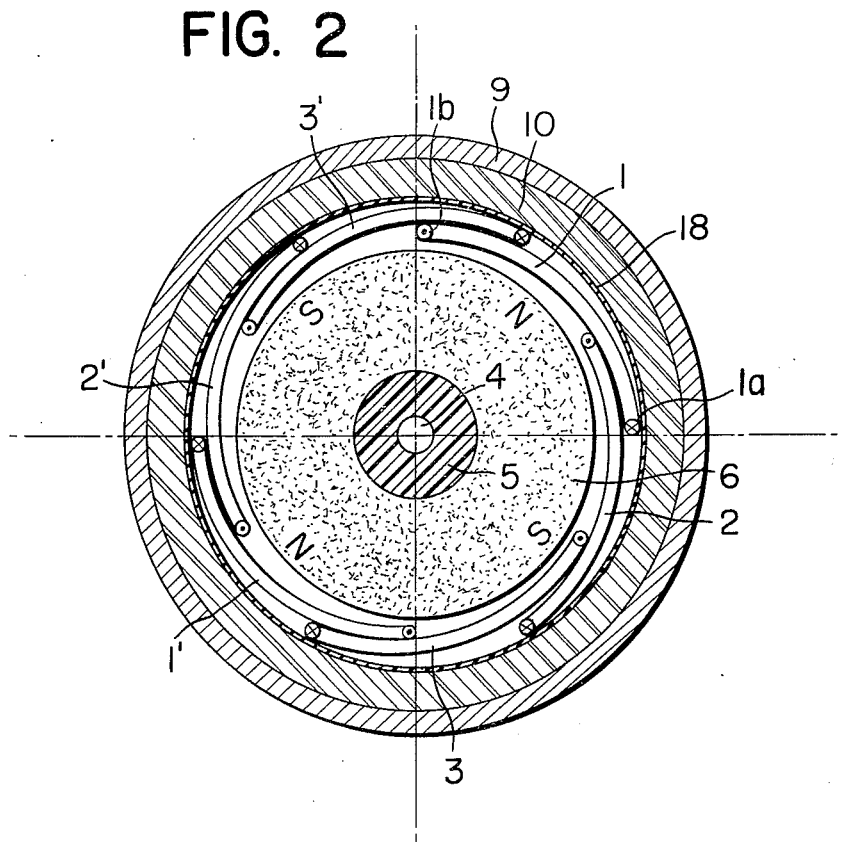
FIG. 2 is a cross sectional view along the line A—A in FIG. 1 viewed from the arrow direction.

Referring to FIG. 1 showing the axial cross section of an embodiment of the brushless DC motor of the present invention, and to FIG. 2 showing a cross section along the line A—A in FIG. 1 viewed from the arrow direction, 1, 1', 2, 2', 3 and 3' indicate armature coils which are structured in three-phase as will be explained later in connection with FIG. 4, to form a coreless armature coil body the structure of which will be explained in detail later. Numeral 4 indicates a rotor shaft on which is fixed, by means of adhesive material 5, a cylindrical permanent magnet 6 which is magnetized in the radial direction so as to have four magnetic poles as shown in FIG. 2. Thus the rotor is composed of said rotor shaft 4, adhesive material 5 and said rotary permanent magnet 6.

Numeral 9 is a drug-cup shaped motor casing of a non-magnetic material which is provided with a bearing 7 in the bottom thereof. A numeral 11 is a disc-shaped rear cover of a non-magnetic material which is provided with a bearing 8 in a part thereof and which is fitted into the open end of said motor casing 9 so as to rotatably support said rotor shaft 4 by means of said bearing 8 and the bearing 7 of said motor casing 9. Numeral 10 is a laminated yoke of a hollow cylindrical shape composed of a plurality of ring-shaped soft magnetic discs. Said laminated yoke 10 is fixed to the internal surface of said motor casing to form a magnetic circuit for the magnetic flux of said permanent magnet 6, and said armature coil body is fixed on an insulating sheet 18 provided on the internal surface of said laminated yoke 10. The stator is thus composed of said motor casing 9, laminated yoke 10, rear cover 11 and said coreless coil body.

There are provided three position detecting elements 12, such as hall elements, for detecting the position of the magnetic poles of said permanent magnet 6, disposed on the internal surface of said rear cover 11 at a position closer than said armature coil body to said rotor shaft 4, and as close as possible to the end face of said permanent magnet 6 in order to maximize the amount of magnetic flux crossing said detecting elements.

Figure 3:
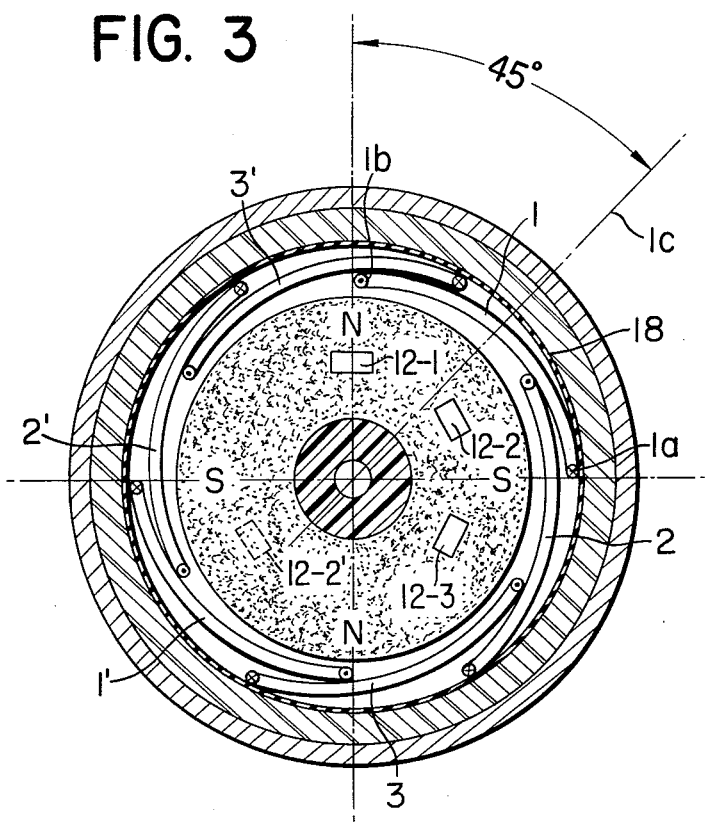
FIG. 3 is a cross sectional view along the line A—A in FIG. 1 viewed from the arrow direction, wherein indicated further is the position detecting element 12 for detecting the position of magnetic poles of permanent magnet rotor 6.

Said three detecting elements 12-1, 12-2 and 12-3 are arranged on said rear cover 11 with an angle of 60° therebetween as shown in FIG. 3. In case such angle of 60° is too narrow for the detecting elements to be employed, it is also possible to arrange said detecting elements with an angle of 120° therebetween, as shown by 12-1, 12-2', 12-3. Numerals 16 and 17 in FIG. 1 indicate the terminals for supplying electric current to the armature coil body and the output terminals of said position detecting elements, respectively.

In the following are explained the structure and the method for producing the aforementioned coreless coil body.

Figure 4:
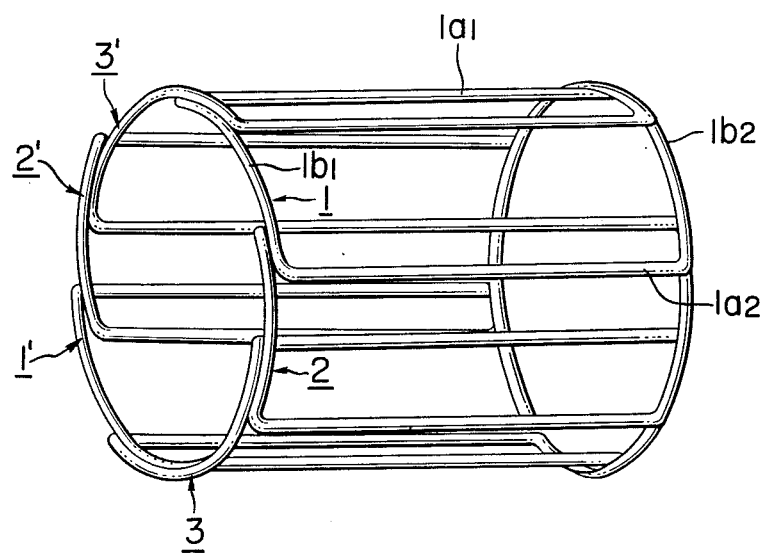
FIG. 4 is a perspective view of the coreless armature coil body employed in the brushless DC motor of the present invention.

Referring to FIG. 4 showing, in a perspective view, an embodiment of the coreless armature coil body to be employed in the brushless DC motor of the present invention, coils 1, 1', 2, 2', 3 and 3' are respectively of substantially rectangular shape composed of two sides ($1a_1$, $1a_2$), ($1'a_1$, $1'a_2$), ($2a_1$, $2a_2$), ($2'a_1$, $2'a_2$), ($3a_1$, $3a_2$), ($3'a_1$, $3'a_2$) substantially parallel to said rotor shaft 4 and other two sides ($1b_1$, $1b_2$), ($1'b_1$, $1'b_2$), ($2b_1$, $2b_2$), ($2'b_1$, $2'b_2$), ($3b_1$, $3b_1$, $3b_2$) and ($3'b_1$, $3'b_2$) formed in an arc shape.

Figure 5:
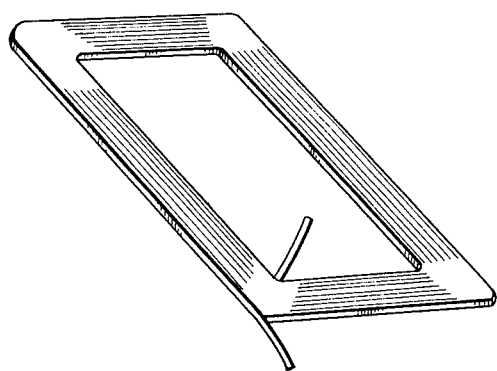
FIG. 5 is a perspective view of a coil constituting the coreless armature coil body shown in FIG. 4 wherein said coil is formed in an approximately rectangular shape.

Each coil 1, 1', 2, 2', 3 or 3' is composed of a heat-fusable self-bonding wire or an ordinary magnet wire and formed at first in a flat shape as shown in FIG. 5. The thus formed coil is temporarily fixed in this shape by heating the case of self-bonding wire, or by a suitable adhesive in the case of an ordinary magnet wire. Successively, each coil is deformed to bend two sides other than those parallel to the rotor shaft into an arc shape. The thus formed coils are arranged in a partially overlapping position to form a cylindrical structure wherein one side in each coil ($1a_1$, $1'a_1$, $2a_1$, $2'a_1$, $3a_1$, $3'a_1$) parallel to the rotor shaft 4 is located on the internal surface of said structure while the other side in each coil ($1a_1$, $1'a_2$, $2a_2$, $2'a_2$, $3a_2$, $3'a_2$) is located on the external surface of said cylindrical structure, and wherein coils 1 and 1' 2 and 2', and 3 and 3' are mutually separated by an angle of 180° and the adjacent coils 1 and 2, 2 and 3 etc. are mutually separated by an angle of 60° the coils are fixed in said cylindrical structure by heating in the csae where the coils are formed of self-bonding wires, or by a suitable adhesive in the case where the coils are formed of ordinary magnet wires. The axial cross section of the thus structured coreless armature coil body is shown in FIGS. 2 and 3.

In the following is explained the method of producing such coreless armature coil body with reference to FIG. 7.

Figure 7:
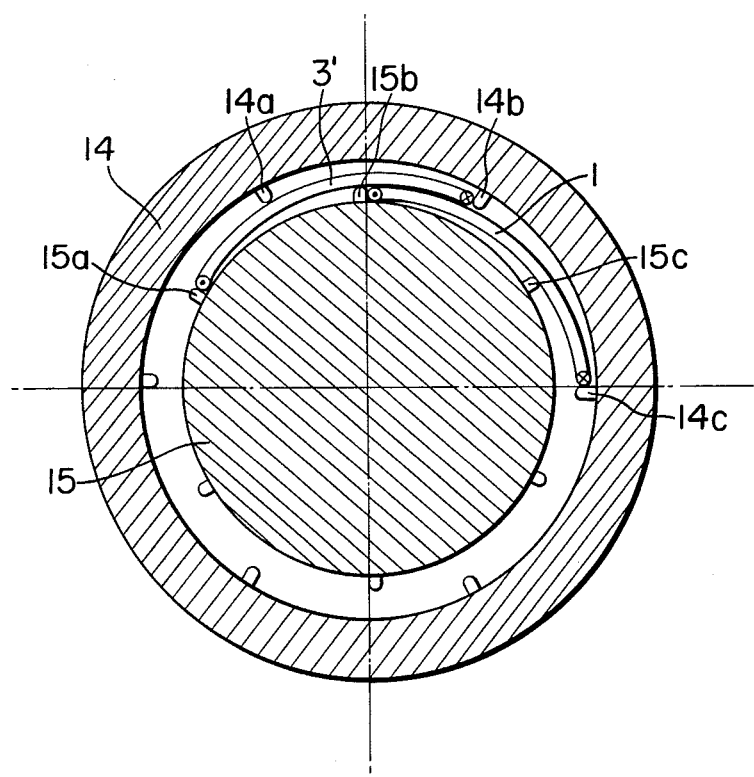
FIG. 7 is a radial cross sectional view of a jig for producing the coreless armature coil body to be employed in the brushless DC motor of the present invention, shown are parts of the coils arranged in said jig.

Referring to FIG. 7 showing a cross section of a jig for producing such coreless armature coil body, wherein is shown a part of the coils are placed in said jig, 14 and 15 are cylindrical jigs for defining the internal and external diameter of said coreless armature coil body. Said jig 14 is provided on the internal surface thereof with plural projecting portions 14a, 14b, 14c . . . extending parallel to the rotor shaft or perpendicular to the drawing plane, the number of which is equal to that of the coils, and said jig 15 is likewise provided on the external surface thereof with similar projecting portions 15a, 15b, 15c. Said jigs 14 and 15 are mutually arranged in such a way that the projecting portions thereof 14a, . . . and 15a, . . . are mutually separated by an angle of 30°.

Figure 6:
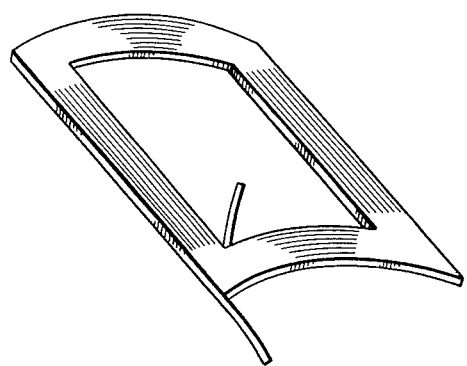
FIG. 6 is a perspective view of a coil shown in FIG. 5 wherein two sides thereof not parallel to the rotary axis are bent in an arc shape in order to form a cylindrical coreless coil body.

At first, coil 3' formed as shown in FIG. 6 is inserted in a space defined by said projecting portions 15a, 14a, 15b and 14b, and then a similar coil 1 is inserted into a space defined by the projecting portions 15b, 14b, 15c and 14c. Successively, the coils 2, 3, 1' and 2' are similarly inserted into the spaces defined by the projecting portions of said jigs 14 and 15. FIG. 7 shows a state where two coils 1 and 3' are inserted. The coils thus inserted into the space of said jigs 14 and 15 are mutually fixed to complete the armature coil body by heating in the cases where the coils are formed of self-bonding wires, or by injecting an adhesive material into said space in the case where the coils are formed of ordinary magnet wires. Even in the case of self-bonding wire it is possible to use an adhesive material if thermal fusion is unable to provide sufficient strength.

Figure 8:
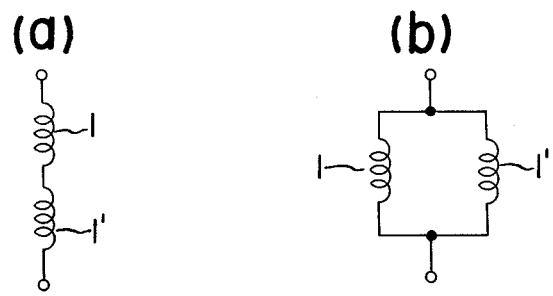
FIG. 8 is a drawing showing the direction of connection of the coils in the brushless DC motor of the present invention.

The coils 1 and 1', 2 and 2', and 3 and 3' in the thus obtained armature coil body are connected either in series as shown in FIG. 8a or in parallel as shown in FIG. 8b for the supply of driving current. A serial connection is suitable for a high voltage drive while a parallel connection is suitable for a low voltage drive.

Figure 9:
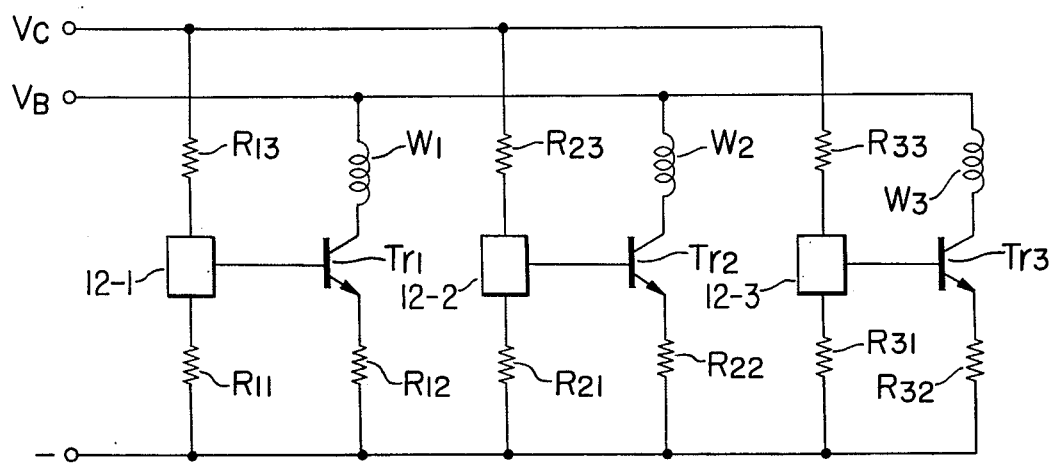
FIG. 9 is a drawing showing the drive circuit for driving the brushless DC motor of the present invention.

An example of the drive circuit for the brushless DC motor of the present invention is shown in FIG. 9.

Referring to FIG. 9, W1, W2 and W3 are armature coils respectively composed of said coils 1 and 1', 2 and 2', and 3 and 3' connected as shown in FIG. 8a or in FIG. 8b. Numerals 12-1, 12-2 and 12-3 are position detecting elements, such as hall effect elements, for detecting the position of the magnetic poles of said permanent magnet 6, said detecting elements being respectively displaced by an angle of 45° from the corresponding armature coils W1, W2 and W3 as shown in FIG. 3. Tr1, Tr2 and Tr3 are drive transistors which are respectively provided with emitter resistances R12, R22 and R32. Said hall effect elements 12-1, 12-2 and 12-3 are respectively connected in series with input resistances R11, R13, R21, R23, R31 and R33 which maintain the control current of said elements 12-1, 12-2 and 12-3 constant and define the base current of said drive transistors Tr1, Tr2, and Tr3. It is also possible to improve the temperature characteristics by using thermisters etc. for such resistances. $V_B$ indicates the voltage of the power supply to the armature coils and $V_C$ indicates the voltage of the power supply to the hall effect elements. A rotation of constant speed can be achieved by controlling said $V_C$ by a suitable means (not shown).

Figure 10:
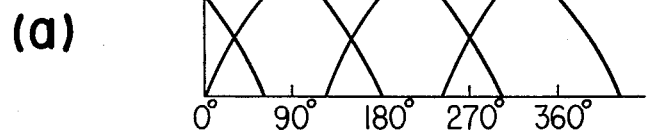
FIG. 10 are diagrams for explaining the torque ripple in a three-phase brushless DC motor of the present invention.
Figure 10:
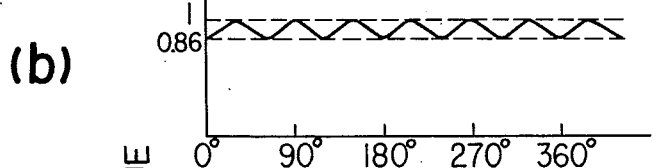
Figure 10:
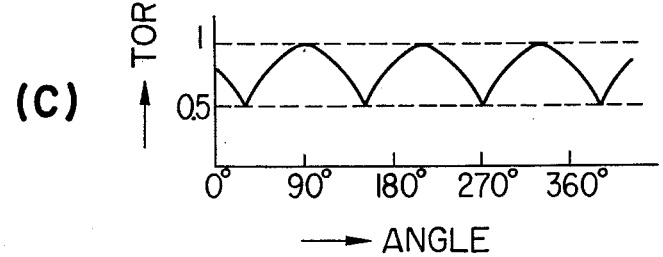

FIG. 10 shows certain diagrams showing the torque ripple of the three-phase brushless DC motor of the present invention shown in FIGS. 1 - 3, wherein the ordinate and abscissa respectively indicate the generated torque and the angle of the rotation of rotor in terms of electric angle. Referring to FIG. 10a, T1, T2 and T3 respectively indicate the torques generated by the armature coils W1, W2 and W3 with a mutual phase difference of 120°. FIG. 10b shows the torque ripple in the case where the drive current is supplied to said coils W1, W2 and W3 respectively for a period of 180° in which case the minimum torque corresponds to 86% of the maximum torque. FIG. 10c shows a case of supplying drive current for a period of 120°, with resulting minimum torque corresponding to 50% of the maximum, thus leading to larger torque ripple. In practical use the torque ripple can be regulated according to the application by selecting suitable drive angle, i.e. by selecting suitable base bias for the drive transistors shown in FIG. 9.

In the following is explained the second embodiment of the brushless DC motor of the present invention shown in FIG. 11, in which the rotary permanent magnet is located on the outer periphery of the armature coil in contrast to the arrangement of the foregoing first embodiment shown in FIGS. 1 - 3 wherein the permanent magnet 6 is placed inside a cylindrical armature coil body.

Figure 11:
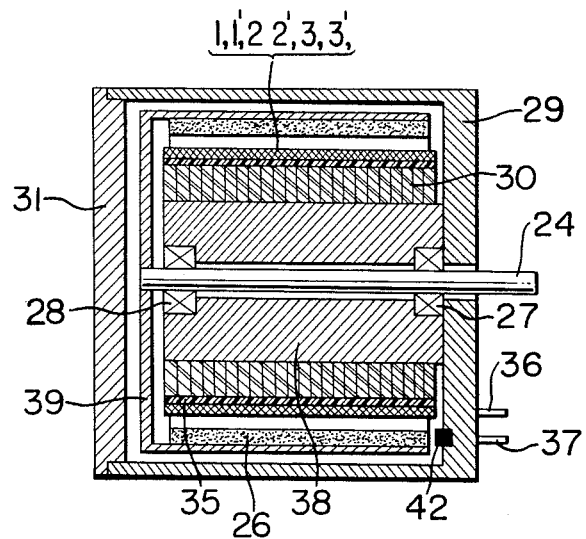
FIG. 11 is an axial cross sectional view of a second embodiment of the brushless DC motor of the present invention.

Referring to FIG. 11, the armature coil body (1, 1', 2, 2', 3, 3') is structured the same as explained in connection with FIGS. 1 - 3. Numeral 29 is a drug-cup shaped motor casing, and 31 is a rear cover which is fitted into the open end of said motor casing 29 to form an enclosed housing with said casing 29. Said casing 29 and rear cover 31 are both formed of a non-magnetic material. Numeral 38 is a non-magnetic cylindrical element fixed, by means for example of an adhesive material, in the center of the bottom of said motor casing 29 to extend in the direction of the rotor shaft. Numerals 27 and 28 indicate bearings fixed on said element 38. Numerals 30 is a laminated yoke of a hollow cylindrical shape composed of a plurality of soft magnetic ring shaped discs, which is fitted on the external surface of said element 38 to form a magnetic circuit for the magnetic flux from a rotary permanent magnet 26. Said armature coil body (1, 1', 2, 2', 3, 3') is provided on an insulating sheet 35 which is in turn provided on said laminated yoke 30. Thus the stator is essentially composed of said motor casing 29, rear cover 31, element 38, laminated yoke 30 and said armature coil body.

Numeral 24 is a rotor shaft rotatably supported by bearings 27 and 28, and 39 is a drug-cup shaped element of a non-magnetic material fixed on said shaft for holding a permanent magnet. Said magnet holding element is provided so as to cover the external periphery of said armature coil body. Numeral 26 is a cylindrical permanent magnet which is fixed, by means of an adhesive material, on the internal periphery of said magnet holding element 39 so as to be parallel to said rotor shaft and is magnetized in the radial direction to have four magnetic poles. Thus the rotor is essentially composed of said permanent magnet 26, magnet holding element 39 and rotor shaft 24.

There are provided three position detecting elements 42, such as hall effect elements, in a position as close as possible to the end face of said rotary permanent magnet 26 in order to maximize the amount of magnetic flux passing said detecting elements. The arrangement of said detecting elements is the same as explained in the foregoing embodiment. Numerals 36 and 37 are respectively the terminals for supplying electric current to the armature coil body and the output terminals of said position detecting elements 42.

The brushless DC motor thus structured can be driven, for example, by means of the drive circuit shown in FIG. 9.

As thus far explained, the armature coil body is composed of plural coils of a polygonal form of which at least two sides are placed parallel to the rotary axis of motor, said coils being mutually arranged in a partially overlapping relationship to form a cylindrical body wherein one of said sides is located on the internal surface thereof while the other side is located on the external surface thereof, so as to obtain substantially uniform diameter and substantially uniform thickness, and is therefore capable of providing substantially uniform flux density to the rotor. Besides, it is capable of providing an elevated flux density in the gap and thus of realizing a motor of a high efficiency. Furthermore, the motor of the present invention permits easy dismantling and assembly, and also permits very precise control since the position detecting elements are located very close to the side face of a rotary permanent magnet in order to maximize the amount of magnetic flux crossing said elements.

Figure 12:
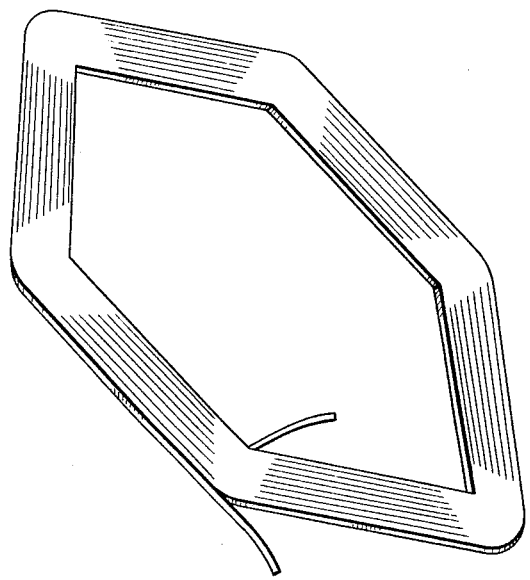
FIG. 12 is a perspective view of an another example of a coil of a shape different from that shown in FIGS. 4 – 6 to be employed in the brushless DC motor of the present invention.

Although the present invention has thus far been explained with respect to embodiments thereof in the form of three-phase four-pole motor, it will be readily understood that the present invention is also applicable to brushless DC motors of other phase numbers or other pole numbers. Also, the effect of the present invention can be achieved with the coils of a shape as shown in FIG. 12.

What is claimed is:

1. A brushless DC motor comprising:
   (a) a rotor including:
   a rotor shaft and
   a rotor permanent magnet fixed on said rotor shaft;
   (b) a stator including:
   a hollow cylindrical yoke made of soft magnetic material as a magnetic flux return path of the magnetic flux from said rotary magnet and
   an armature coil body formed in the shape of a hollow cylinder, wherein said armature coil body is disposed in an annular space between said rotary magnet and said yoke and is fixed on the internal surface of said yoke, said coil body comprising a plurality of coil elements each of which is of planar multiangular ring shape having two sides substantially parallel to the axis of said rotor shaft, and said coil body being constructed such that all of said coil elements are superposed on one another in such a relation that one of said two sides of each coil element appears outside, and another of said two sides of each coil element appears inside, so that a ring shape of coil body is formed, and said coil elements being fixed in a cylindrical structure;
   (c) a casing having end walls and supporting said rotor and stator; and
   (d) position detecting elements for detecting the position of magnetic poles of said rotary permanent magnet, said elements being mounted on an end wall of said casing adjacent to the end surface of said rotary permanent magnet at the place where it is not covered by said coil body.

2. A motor according to claim 1 wherein said coil elements are of planar substantially rectangular shape.

3. A motor according to claim 1 wherein said coil elements are of planar substantially hexagonal shape.

4. A motor according to claim 1 wherein said rotary permanent magnet is magnetized in radial directions to have four poles.

5. A motor according to claim 4 wherein said armature coil body is connected in three phases.

6. A motor according to claim 1 wherein said armature coil body is fixed to said yoke through an insulating sheet.

7. A brushless DC motor according to claim 1 wherein the remaining sides of each coil element are of arc shape and wherein said coil body is of a substantially uniform thickness to provide a substantially uniform flux density to the rotor.

8. A brushless DC motor driven by a current supply from a driving circuit comprising:
   (a) a rotor including:
   a rotor shaft and
   a rotor permanent magnet fixed on said rotor shaft;
   (b) a stator including:
   a hollow cylindrical yoke made of soft magnetic material as a magnetic flux return path of the magnetic flux from said rotary magnet and
   an armature coil body formed in the shape of a hollow cylinder, wherein aid armature coil body is disposed in an annular space between said rotary magnet and said yoke and is fixed on the internal surface of said yoke, said coil body comprising a plurality of coil elements each of which is of planar multiangular ring shape having two sides substantially parallel to the axis of said rotor shaft, and said coil body being constructed such that all of said coil elements are superposed on one another in such a relation that one of said two sides of each coil element appears outside, and other of said two sides of each coil element appears inside so that a ring shape of coil body is formed, and said coil elements being fixed in a cylindrical structure;
   (c) a casing having end walls and supporting said rotor and stator; and
   (d) position detecting elements for detecting the position of magnetic poles of said rotary permanent, said elements being mounted on an end wall of said casing adjacent to the end surface of said rotary permanent magnet at the place where it is not covered by said coil body, the outputs of said detecting elements being utilized for controlling the current supply to said armature coil body by said driving circuit.

9. A brushless DC motor according to claim 8 wherein an insulating sheet is interposed between said coil body and said hollow cylindrical yoke.

10. A brushless DC motor according to claim 8 wherein said coil elements are of planar hexagonal shape.

11. A brushless DC motor according to claim 10 wherein said coil elements are so arranged that no more than two thicknesses of coil element occur in any radial direction of said coil body.

12. A brushless DC motor according to claim 8 wherein said coil elements are of planar substantially rectangular shape.

13. A brushless DC motor according to claim 8 wherein said rotary permanent magnet means is magnetized in radial directions to provide four poles.

14. A brushless DC motor according to claim 8 wherein said hollow cylindrical yoke comprises a plurality of rings of soft magnetic material said rings being mutually laminated.

15. A brushless DC motor according to claim 8 wherein said detecting element means include Hall elements.

* * * * *